(12) United States Patent
Spickermann

(10) Patent No.: US 6,590,683 B1
(45) Date of Patent: Jul. 8, 2003

(54) BANDWIDTH EFFICIENT PHASE SHIFT KEYED MODULATION OVER NONLINEAR DISTORTION LIMITED OPTICAL FIBER LINKS

(75) Inventor: Ralph Spickermann, Redwood City, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/245,160

(22) Filed: Feb. 4, 1999

(51) Int. Cl.[7] .............................................. H04B 10/00
(52) U.S. Cl. ...................... 359/161; 359/188; 359/180; 359/124; 359/133; 330/149; 327/317; 327/318; 327/355; 327/356; 327/362
(58) Field of Search ................................ 359/161, 124, 359/173, 133, 183, 188, 180, 181, 182, 154; 330/149; 327/317, 318, 355, 356, 362

(56) References Cited

U.S. PATENT DOCUMENTS

| | | | | |
|---|---|---|---|---|
| 4,953,156 A | * | 8/1990 | Olshansky et al. ............ 370/3 |
| 5,060,310 A | * | 10/1991 | Frisch et al. ................. 359/188 |
| 5,222,103 A | * | 6/1993 | Gross ........................... 375/54 |
| 5,239,401 A | * | 8/1993 | Olshansky ................... 359/188 |
| 5,453,868 A | * | 9/1995 | Blauvelt et al. ............. 359/173 |
| 5,546,190 A | * | 8/1996 | Hill et al. .................... 359/158 |
| 5,812,294 A | * | 9/1998 | Wilson ........................ 359/161 |
| 5,828,477 A | * | 10/1998 | Nilsson et al. .............. 359/181 |
| 5,850,305 A | * | 12/1998 | Pidgeon ....................... 359/187 |
| 5,896,211 A | * | 4/1999 | Watanabe .................... 359/124 |
| 5,963,352 A | * | 10/1999 | Atlas et al. .................. 359/161 |
| 6,118,566 A | * | 9/2000 | Price ........................... 359/181 |
| 6,122,086 A | * | 9/2000 | Djupsjobacka .............. 359/181 |
| 6,178,026 B1 | * | 1/2001 | Yoshida ....................... 359/187 |
| 6,282,005 B1 | * | 8/2001 | Thompson et al. .......... 359/173 |
| 6,362,903 B1 | * | 3/2002 | Spickermann et al. ...... 359/124 |
| 6,407,837 B1 | * | 6/2002 | Spickermann .............. 359/124 |

* cited by examiner

*Primary Examiner*—Leslie Pascal
*Assistant Examiner*—Hanh Phan
(74) *Attorney, Agent, or Firm*—Kenneth W. Float

(57) ABSTRACT

Systems and methods that increase the data transmission rate through a given length of optical fiber, or increase the distortion-limited distance for an optical fiber link at a given data rate using band efficient modulation. This is achieved by modulating data for transmission onto a carrier signal. The modulated signal is predistorted and an optical carrier is amplitude modulated using the predistorted signal. The amplitude modulated optical carrier is transmitted over the optical fiber link. The original modulated microwave signal is reproduced at a receiver. The original signal is demodulated to generate the originally transmitted data. In addition, to reduce the bandwidth required by the modulated carrier, it may be single-sideband modulated. By increasing the number of bits per symbol and keeping the symbol rate constant, the data rate for a given length of optical fiber may be increased using the present invention without introducing additional distortion in the fiber.

18 Claims, 1 Drawing Sheet

BANDWIDTH EFFICIENT PHASE SHIFT KEYED MODULATION OVER NONLINEAR DISTORTION LIMITED OPTICAL FIBER LINKS

BACKGROUND

The present invention relates generally to fiber optic communications systems and methods, and more particularly, to the use of band efficient modulation formats to increase data transmission rates for a given nonlinear distortion limited fiber link, or increase the distortion-limited distance for an optical fiber link at a given data rate.

The deleterious effects of nonlinear distortion in combination with chromatic dispersion slope in optical fiber transmission increase with symbol rate and fiber length. Nonlinear distortion means that the refractive index of the fiber varies according to the instantaneous amplitude of the light being transmitted. Therefore, the instantaneous propagation velocity of the light varies according to its instantaneous amplitude. This causes the instantaneous phase of the light to be perturbed, which causes the optical spectrum of the symbol to broaden. This broader optical spectrum is much more subject to chromatic dispersion, which distorts the symbol in amplitude. This distortion ultimately limits the maximum symbol rate that can be transmitted over a given length of fiber.

Previous solutions that attempt to mitigate against this include using expensive optical equalization techniques and return to zero data formats versus non-return to zero. Note that these solutions and others universally are based on simple On-Off-Keying (OOK) of the optical carrier.

With the prior art OOK modulation format, symbols are affected dissimilarly, because the amplitude versus time in each symbol differs. For example, a short pulse "1" in the sequence "010" will distort differently than the longer pulse "111" in the sequence "01110", and so forth. The end result of this situation is an unintelligible mess, with no straightforward means of distortion compensation.

Therefore, it would be advantageous to have systems and methods that use alternative modulation methods that are more robust than OOK versus nonlinear distortion and dispersion slope over a given fiber length, but keep the data rate the same or better. It would also be advantageous to have systems and methods that use phase shift keyed (PSK) modulation to accomplish this.

SUMMARY OF THE INVENTION

The present invention provides for systems and methods that use band efficient phase shift keyed (PSK) modulation to increase the data transmission rate through a given nonlinear distortion limited optical fiber link, or equivalently to increase the distortion-limited distance for an optical fiber link at a given data rate. This is achieved by amplitude modulating an optical carrier using a microwave carrier with the data encoded on it through PSK modulation. Using the present invention, distortion-limited data rates and/or distances may be increased without introducing expensive optical distortion mitigating devices.

The principal reason for this improvement is, that with PSK modulation each symbol behaves similarly with respect to optical amplitude dependent distortion. This is because the optical amplitude envelope of each symbol is similar versus time. The only difference is a phase shift of the envelope. Thus the amplitude dependent distortion is the same for each symbol, and although distorted, the symbols stay equally spaced in time. This distortion may be counteracted with predistortion and other equalization techniques on the microwave PSK signal.

The use of phase shift keyed modulation, for example, has the additional advantage that, by increasing the number of bits per symbol and keeping the symbol rate constant, the data rate for a given length of fiber may be increased without introducing additional distortion.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Effects of dispersion and nonlinear distortion in optical fiber transmission increase with symbol rate and fiber length. This distortion ultimately limits the maximum symbol rate that can be transmitted over a given length of optical fiber comprising an optical fiber link 15.

Figure 1:
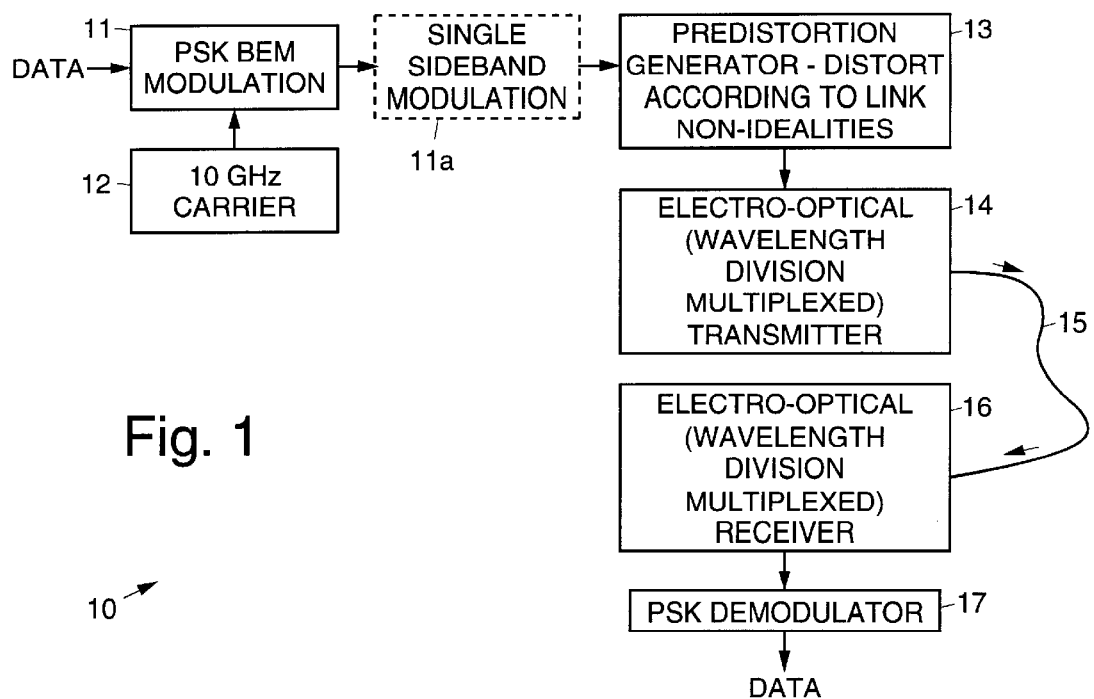
FIG. 1 illustrates an exemplary system in accordance with the principles of the present invention.

Referring to the drawing figures, FIG. 1 shows an exemplary system 10 in accordance with the principles of the present invention. The exemplary system 10 comprises a phase shift keyed (PSK) bandwidth efficient modulator 11 that is used to PSK modulate data for transmission onto a 10 GHz (for example) microwave carrier 12. The modulated microwave carrier is predistorted using a predistortion generator 13 to compensate for non-idealities of the optical fiber link 15. Such non-idealities include nonlinear distortion.

The modulated, predistorted microwave carrier is then used to amplitude modulate a laser of an electro-optic transmitter 14. The laser may be one of many in a wavelength division multiplexed (WDM) transmitter 14, for example, as is illustrated in FIG. 1.

The optical signal is transmitted over an optical fiber link 15 comprising an optical fiber 15 and is processed by an electro-optical receiver 16 at a receiving end of the fiber 15 that reproduces the PSK modulated microwave carrier signal. The microwave signal is then demodulated in a PSK demodulator 17 to generate the originally transmitted data.

In accordance with the principles of the present invention, the data rate for a given length of optical fiber 15 may be increased without increasing the symbol rate. This is done by increasing the number of information bits indicated by each symbol output from the bandwidth efficient modulator 11 through the use of higher order modulation.

By keeping the symbol rate constant, the data rate for a given length of fiber may he increased without introducing additional fiber distortion. Alternatively, data may be transmitted at a given data rate with sufficiently low symbol rate to realize an increase in transmission distance of the distortion-limited fiber 15. Furthermore, to reduce the bandwidth required by the modulated microwave carrier, the microwave carrier may be single-sideband modulated using a single-sideband modulator 11a.

Figure 2:
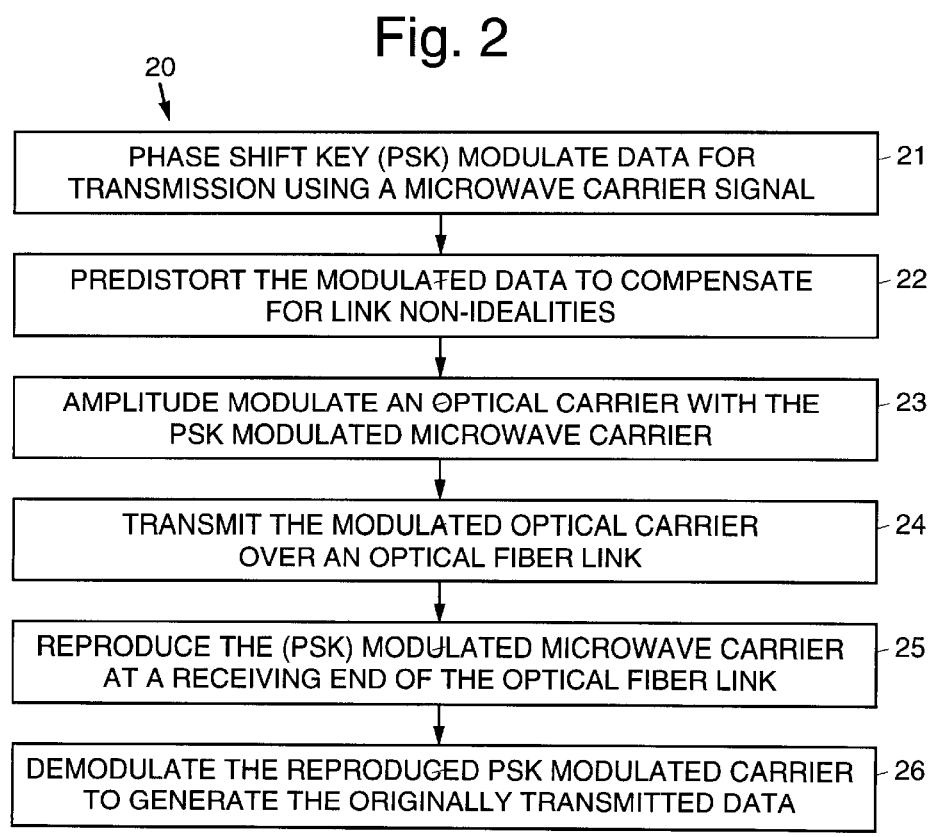
FIG. 2 illustrates exemplary methods in accordance with the principles of the present invention.

For the purposes of completeness, FIG. 2 illustrates exemplary methods 20 in accordance with the principles of the present invention. Data for transmission is PSK modulated 21, for example, onto a microwave carrier signal. The modulated signal is then predistorted 22 to compensate for link non-idealities. The predistorted signal is used to amplitude modulate 23 an optical carrier. The modulated optical carrier is transmitted 24 over an optical fiber link 15. The original PSK modulated microwave signal is reproduced 25 at a receiver at the opposite end of the optical fiber link 15. The reproduced original PSK modulated microwave signal is demodulated 26 to generate the originally transmitted data.

Thus, the present invention provides for systems and methods that increase data transmission through a given non-linear distortion limited fiber link, or, alternatively increase the distortion-limited distance for an optical fiber link at a given rate. An additional benefit is that use of higher order modulation techniques to transmit on an optical fiber allows the use of relatively low speed electronics. This is because the electronics operate according to the symbol rate, not the bit rate.

It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A method that selectively increases the data transmission rate through a nonlinear distortion limited optical fiber link, or increases the distortion-limited distance for an optical fiber link at a given data rate, comprising the steps of:

modulating data for transmission onto an electrical carrier signal;

predistorting the modulated electrical carrier signal in a manner that compensates for optical fiber link nonlinearities;

amplitude modulating an optical carrier using the predistorted electrical carrier signal;

transmitting the amplitude modulated optical carrier signal over the optical fiber link;

reproducing the original modulated signal at a receiver to produce the original electrical carrier signal; and demodulating the original electrical carrier signal to generate the originally transmitted data.

2. The method recited in claim 1 wherein the step of modulating data for transmission comprises the step of phase shift key modulating data for transmission.

3. The method recited in claim 1 wherein the step of modulating data for transmission comprises the step of phase shift key modulating data for transmission onto a microwave carrier signal.

4. The method recited in claim 3 wherein the microwave carrier signal has a frequency of about 10 GHz.

5. The method recited in claim 1 wherein the predistorted modulated carrier signal compensates for non-idealities of the optical fiber link.

6. The method recited in claim 1 wherein the predistorted modulated carrier signal compensates for nonlinear distortion.

7. The method recited in claim 1 wherein the step of amplitude modulating the optical carrier using the predistorted signal comprises the step of amplitude modulating a laser of an electro-optic transmitter.

8. The method recited in claim 1 wherein the step of amplitude modulating the optical carrier using the predistorted signal comprises the step of amplitude modulating a laser of a wavelength division multiplexed transmitter.

9. The method recited in claim 1 further comprising the step of single-sideband modulating the microwave carrier to reduce the bandwidth required by the modulated microwave carrier.

10. An apparatus that selectively increases the data transmission rate through a nonlinear distortion limited optical fiber link, or increases the distortion-limited distance for an optical fiber link at a given data rate, comprising:

an electrical modulator for modulating data for transmission onto an electrical carrier signal derived from an electrical carrier signal generator;

a predistortion generator for predistorting the modulated electrical carrier signal in a manner that compensates for optical fiber link nonlinearities;

an electro-optical transmitter for amplitude modulating an optical carrier using the predistorted electrical carrier signal and for transmitting the amplitude modulated optical carrier signal over the optical fiber link;

an electro-optical receiver for reproducing the original modulated electrical signal to produce the original electrical carrier signal; and a demodulator for demodulating the original electrical carrier signal to generate the originally transmitted data.

11. The apparatus recited in claim 10 wherein the electrical modulator phase shift key modulates the data for transmission.

12. The apparatus recited in claim 10 wherein the electrical modulator phase shift key modulates data for transmission onto a microwave carrier signal.

13. The apparatus recited in claim 12 wherein the microwave carrier signal has a frequency of about 10 GHz.

14. The apparatus recited in claim 10 wherein the predistorted modulated carrier signal compensates for non-idealities of the optical fiber link.

15. The apparatus recited in claim 10 wherein the predistorted modulated carrier signal compensates for nonlinear distortion.

16. The apparatus recited in claim 10 wherein the electro-optic transmitter comprises a laser.

17. The apparatus recited in claim 10 wherein the electro-optic transmitter comprises a wavelength division multiplexed transmitter.

18. The apparatus recited in claim 10 further comprising a single-sideband modulator.

* * * * *